US006441128B1

(12) United States Patent
Bauman et al.

(10) Patent No.: US 6,441,128 B1
(45) Date of Patent: Aug. 27, 2002

(54) ECTFE SURFACES MODIFIED BY FLUORO-OXIDATION AND A PROCESS THEREFOR

(76) Inventors: Bernard D. Bauman, 3010 Winding Shore La., Katy, TX (US) 77450; Michael S. Cork, 2552 Honeysuckle, Richardson, TX (US) 75082

( * ) Notice: Subject to any disclaimer, the term of this patent is extended or adjusted under 35 U.S.C. 154(b) by 184 days.

(21) Appl. No.: 09/649,155

(22) Filed: Aug. 28, 2000

(51) Int. Cl.⁷ .................................................. C08F 6/00
(52) U.S. Cl. ....................................................... 528/480
(58) Field of Search .......................................... 528/480

(56) References Cited

U.S. PATENT DOCUMENTS

| | | | |
|---|---|---|---|
| 4,020,223 A | 4/1977 | Dixon et al. ................. 428/224 |
| 4,822,426 A | 4/1989 | Ito et al. ....................... 106/218 |
| 4,865,711 A | 9/1989 | Kittler .......................... 204/192 |
| 4,886,689 A | 12/1989 | Kotliar ....................... 428/35.7 |
| 5,073,175 A | 12/1991 | Anand et al. ................... 55/16 |
| 5,093,403 A | 3/1992 | Rau et al. .................... 524/404 |
| 5,098,618 A | 3/1992 | Zelez .......................... 264/446 |
| 5,460,661 A | 10/1995 | Maynard, Jr. ............... 148/251 |
| 5,948,484 A | 9/1999 | Gudimenko et al. ........ 427/489 |

*Primary Examiner*—Terressa M. Boykin
(74) *Attorney, Agent, or Firm*—Donald Diamond

(57) ABSTRACT

A process for fluoro-oxidation of the surface(s) of an ECTFE substrate, film or three-dimensional object, and the surface-modified substrate, film or object produced thereby. The process includes exposing the surface(s) to concentrations of fluorine and oxygen for a time sufficient to increase the surface energy and thereby lower the surface contact angle sufficiently to permit bonding. The surface modification allows bonding to an adhesive with the adhesive being bondable to a plastic or metal substrate.

12 Claims, No Drawings

ECTFE SURFACES MODIFIED BY FLUORO-OXIDATION AND A PROCESS THEREFOR

BACKGROUND OF THE INVENTION

1. Field of the Invention

The invention elates to the surface modification of fluoropolymers for the purpose of facilitating adhesion and bondability, and more particularly to fluoro-oxidation of ethylene-chlorotrifluoroethylene copolymer (ECTFE).

2. Description of the Related Art

Compared to other polymers, fluoropolymers have outstanding resistance to chemical attack and remain stable at high temperature. Therefore they would appear to be outstanding candidate materials for chemical barrier coatings. But the physical properties that provide resistance and stability, viz., low surface-energy, very long chains, chemical inertness, high molecular weight, high melt viscosity with a narrow temperature range between melt and degradation, and poor heat conductivity, make them very difficult to adhere and bond to other materials.

ECTFE, a melt-processable fluoropolymer with a 1:1 alternating copolymer structure of ethylene and chlorotrifluoroethylene, is particularly suitable for chemical barrier coatings. ECTFE has been shown to provide excellent chemical and abrasion resistance, extremely low permeability to liquids, gases and vapors, a low dielectric constant, a broad range of useful temperature between cryogenic and 300° F. (149° C.), and low flame spread and smoke generation. ECTFE also is the toughest fluoropolymer and offers excellent chemical resistance to a wide variety of corrosive chemicals and organic solvents, as well as to strong acids, chlorine, and aqueous caustics. No known solvent dissolves or stress cracks ECTFE at temperatures below 250° F. (120° C.).

ECTFE is manufactured as HALAR™ pellets by the Ausimont USA plant in Orange, Tex. The pellet form can then be converted into powder, solids, sheeting, or extruded film. Although ECTFE can be machined, welded and thermoformed, adhering the film to polymeric and metallic surfaces and adhering three-dimensional ECTFE objects to three-dimensional polymeric and metallic objects have heretofore not been achieved. Where used as lining material for the interior of piping, either a powder coating is electrostatically applied to the pipe interior surface or the pipe is lined with tubular sheeting. Kem-Tuff™ process exhaust systems manufactured by GDS Manufacturing of Williston, Vermont have a primer and ECTFE top coat electrostatically applied to a stainless steel substrate. Electro Chemical Engineering & Manufacturing Co. of Emmaus, Pennsylvania manufactures Duro-Bond™ sheet linings consisting of a layer of ECTFE laminated to a fabric or vulcanized soft rubber backing. Lining Technologies, Inc. of Denham Springs, Louisiana manufactures ECTFE linings for tankage and piping both in powder-applied and sheeting form.

Techniques for bonding fluoropolymers to otherwise incompatible materials are described in the related art. U.S. Pat. No. 5,460,661 to W. C. Maynard, Jr. discloses a method for bonding a fluoropolymer to the surface of a metal substrate. The fluoropolymer is applied to the surface as a powder and then heated above its transition temperature (i.e., the temperature at which the melted fluoropolymer flows together or otherwise transitions from a molten, non-agglomerated state to a continuous molten state), causing it to flow out and thereby form a unitary, void-free coating. The fluoropolymer-coated substrate is then held at a temperature above the melting temperature but below the transition temperature for a sufficient time to allow the halogen (the fluorine or chlorine from the halogen-polymer subunits in the fluoropolymer) to chemically bond to the metal. U.S. Pat. No. 4,865,711 to W. C. Kittler discloses a method for treating the surface of polymers of low surface energy, such as fluoropolymers. A thin layer of carbon is deposited on the surface of a fluoropolymer, polyimide, polyester, or polyolefin. Deposition is preferably carried out by sputtering, producing a carbon layer less than 300 angstroms (Å) in depth. Polymeric material so treated may find use as layers in laminates and as substrates for deposition of metals. U.S. Pat. No. 4,886,689 to A. M. Kotliar et al. discloses a method for bonding fluoropolymers to polyolefins using an adhesive composed of mechanically interlocked bonds, i.e., bonds where molten polymer fractions entwine and wrap around one another in the melt, and are solidified in this state. The adhesive is a melt blend of the polymers contained in the layers it is desired to laminate. Alternatively, the adhesive may contain polymers that are not identical to those in the layers but which are sufficiently similar to a corresponding component in the layers. U.S. Pat. No. 5,093,403 to S. E. Rau et al. discloses a method for bonding a fluoropolymer to a metal substrate wherein a resinous coating is formed by fusing a composition including a major amount of the fluoropolymer and a minor amount of one or more additives which improve(s) properties such as corrosion-resistance, abrasion-resistance, and bonding characteristics. The compositions fall into three classes based upon the uses to which they are put: primer coatings, barrier coatings, and abrasion/wear-resistant functional coatings. Primer coatings bond very strongly to the underlying metal substrate and themselves provide a substrate to which coatings having other properties may be bonded. Some compositions bond strongly to a metal substrate and also provide a barrier to chemical attack. Compositions which bond most strongly to a substrate are useful also as abrasion-resistant coatings applied directly to the substrate or over other polymer coatings. U.S. Pat. No. 5,152,323 to D. A. Shotts et al. discloses a metal pipe with an inner thermoplastic sleeve melt-bonded to the pipe. The sleeve material may be a fluoropolymer such as ECTFE or any other type of melt-processable thermoplastic.

U.S. Pat. No. 4,822,426 discloses a family of primer compositions which allow bonding together highly crystalline polymeric resin substrates and painting or printing on such substrates. A composition consists essentially of: (a) at least one member selected from the group consisting of organometallic compounds, natural resins, and synthetic resins; and (b) at least one fluorine-containing compound which is a linear or cyclic hydrocarbon having a polar group such as a hydroxyl or carbonyl group in the molecule in which part or all of the hydrogen atoms are substituted with fluorine atoms.

Modification of plastic surfaces to improve their surface properties is described in the related art. U.S. Pat. No. 5,948,484 to Y. Gudimenko et al. discloses a process for modifying substrate surfaces which provides improved resistance to erosion, decreased permeability to water vapor and oxygen, control of hydrophobicity, and in some cases changes in properties such as friction coefficient, surface resistivity, ultraviolet/visible/infrared transmissivity, and adhesion. The process includes: surface activation of the substrate wherein reactive hydrogen groups are formed in a surface region; and silylation of at least a portion of the reactive hydrogen groups with a silylating agent, whereby silicon-containing groups of the silylating agent become incorporated in the surface region. Preferably, surface activation occurs when the substrate is exposed to a combination of ultraviolet radiation and oxygen, thus photo-oxidizing the substrate. After surface activation, the reactive hydrogen groups in the surface region are reacted with a silylating agent, replacing the hydrogen atoms of the active hydrogen groups with silicon-containing groups. The process preferably includes a third, oxidative stabilization step wherein silcon-containing polymer chains in the surface region are converted into stable structures enriched with silicon and oxygen. U.S. Pat. No. 5,098,618 to J. Zelez discloses a process for increasing hydrophilic wettability wherein a plastic substrate is exposed to ultraviolet radiation in the presence of monatomic oxygen for about 5 to 60 minutes. Suitable substrates include polyethylene, polypropylene, polystyrene, polymethylmethacrylate, silcone-elastomers, polyurethanes, polyamides, polyimides and polyethers.

Fluoro-oxidation of polymers is described in the related art. U.S. Pat. No. 4,020,223 to D. D. Dixon et al. discloses a method for surface treating fiber form synthetic polyolefin or polyacrylonitrile resins using low levels of monatomic fluorine in combination with low levels of monatomic oxygen and an inert carrier gas. A fluorinated carboxylated layer formed on the polymer surface results in enhanced water transport and soil release characteristics. U.S. Pat. No. 5,073,175 to M. Anand et al. discloses a process for fluoro-oxidizing polymeric gas separation membranes which have improved gas separation selectivity for gas mixtures such as $O_2/N_2$. Fluoro-oxidation is carried out by contacting the polymer surface either simultaneously or sequentially with a reactive fluorine source and an oxidation source.

None of these references addresses adhering or bonding ECTFE film to polymeric or metallic substrates. To be commercially viable in the manufacture of chemically resistant ductwork the simplicity of implementing a process for modifying film surface characteristics to enable adhesion and the cost of film so modified should be competitive with the alternatives of ECTFE powder deposition and welded or mechanically attached tubular sheeting. Nor do any of these references address adhering or bonding three-dimensional objects fabricated from ECTFE to three-dimensional polymeric or metallic objects.

OBJECTS OF THE INVENTION

In view of the limitations of the related art, it is a primary object of the present invention to provide a process for modifying the surface properties of ECTFE film to enable adhesion to polymeric and metallic surfaces.

Another object of the invention is to provide surface-modified ECTFE film which can be adhesively bonded to polymeric and metallic surfaces with any of a wide range of liquid adhesives.

Yet another object of the invention is to provide a surface modification process and a surface-modified film which are cost-effective in manufacturing ECTFE linings for tankage, piping and ductwork.

Still another object of the invention is to provide surface-modified three-dimensional ECTFE objects which can be adhesively bonded to polymeric and metallic objects.

Other objects of the invention will become evident when the following description is considered.

SUMMARY OF THE INVENTION

These and other objects are achieved by the present invention which in a first aspect provides a process for modifying at least one surface of a fluoropolymer consisting essentially of a 1:1 alternating copolymer of ethylene and chlorotrifluoroethylene, i.e., ECTFE. Each surface is exposed to a gaseous composition including effective concentrations of molecular fluorine and molecular oxygen for a period of time sufficient to increase the surface energy of the surface, thereby sufficiently decreasing the surface contact angle to allow bonding between the surface and an adhesive.

In another aspect the invention provides a fluoropolymer film having at least one fluoro-oxidized surface. The film consists essentially of ECTFE wherein each such surface has a contact angle of less than about 50 degrees.

In still another aspect the invention provides a three-dimensional ECTFE object having at least one fluoro-oxidized surface wherein each such surface has a contact angle of less than about 50 degrees.

A more complete understanding of the present invention and other objects, aspects and advantages-thereof will be gained from a consideration of the following description of the preferred embodiment.

DESCRIPTION OF THE PREFERRED EMBODIMENT

I. TECHNICAL OVERVIEW

While the present invention is open to various modifications and alternative constructions, the preferred embodiment is described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

When a droplet of liquid is placed on a solid surface and the surface tension of the liquid is larger than the surface tension of the solid, the droplet makes a definite angle of contact, viz., the surface contact angle, between the liquid and solid. When the same liquid is placed on surfaces of increasing surface tension (i.e., of increasing surface energy) the surface contact angle decreases as the surface tension of the solid increases. On a high surface energy material, an adhesive can flow (or "wet-out") to assure a relatively strong bond. Thus the surface contact angle is a measure of the hydrophilicity of a surface. As defined herein, the surface contact angle is the angle in a plane normal to a generally planar ECTFE film surface between a tangent at a peripheral point of contact of a droplet of pure, deionized water placed on the surface and the surface.

Due to increased functionality brought about by fluoro-oxidation, the surface-modified ECTFE of this invention has high surface energy resulting in a surface contact angle sufficiently low to enable a surface so modified to effectively and tenaciously bond to a primer-coated plastic or metal surface. Fluoro-oxidized films or solid objects are prepared by treating at least one surface with a gaseous composition containing molecular fluorine ($F_2$) and molecular oxygen ($O_2$) together with an inert carrier such as molecular nitrogen ($N_2$). $F_2$ is generally present in the composition in an amount from about 7 to about 25 percent by volume and, preferably, in an amount from about 10 to about 15 percent by volume. $O_2$ is generally present in the composition in an amount from about 7 to about 25 percent by volume and, preferably, in an amount from about 10 to about 15 percent by volume. The balance of the composition to 100% by volume comprises the inert carrier gas.

The function of the fluorine is to initiate the oxidation chemistry, while the function of the oxygen is to react with the polymer to create oxygen-containing functionalities. It is theorized that hydroxyl and carboxyl groups are created on and to a depth of a few hundred angstroms below the modified surface. Fluoro-oxidation of ECTFE film can be carried out over a temperature range of about 45° F. to about 250° F., and a pressure range of about 0.1 atmosphere to about 3,0 atmospheres. Critically important variables in the treatment of ECTFE are the absolute concentrations of fluorine and oxygen to which a surface is exposed. These concentrations depend both on the respective volume percent concentrations and the gas pressure. For example, the reactivity of a gaseous composition with 12 percent by volume $F_2$ at 1.0 atmosphere pressure approximately equals the reactivity of a gaseous composition with 24 percent by volume $F_2$ at 0.5 atmosphere or 4 percent by volume $F_2$ at 3.0 atmospheres. Consequently, shorter exposure times are sufficient as volume percent concentrations and/or pressure are increased. Processing conditions, viz., temperature, pressure, concentrations of the fluorine and oxygen, and exposure time should be so selected that the temperature rise of a surface-modified ECTFE product during the fluoro-oxidation treatment does not exceed the melt temperature of the product.

II. EXPERIMENTAL PROCEDURE

Samples of ECTFE film approximately 1-inch×2-inches of 5-, 7.5- and 10-mil thickness obtained from Norton Performance Plastics Corporation of Wayne, N.J. were exposed at ambient temperature to a 1.0 atmosphere reactive gas in a "pipe reactor." The reactor was a generally vertical 6-inch inner diameter stainless steel pipe, 12-inches long, flanged at opposed inlet and outlet ends, with a flange plate having a 3/16-inch gas fitting bolted to each end. Proximate and generally parallel to the inlet flange plate was a diffuser assembly including a stainless steel disc about 1/16-inch thick having a multiplicity of fine holes therethrough, and a downstream Monel™ screen proximate and generally parallel to the disc. In a pipe reactor, the purpose of the diffuser assembly is to create a uniform gas flow across the reactor. Each reactive blend of $F_2$, $O_2$ and $N_2$ was prepared in a separate blender device before being admitted at ambient temperature through the inlet gas fitting. Two runs each with six film samples in the reactor, one with the $F_2$ concentration 5.00% and the $O_2$ concentration 15.75% and the other with the respective concentrations 10.00% and 10.50%, were performed for each of the three sample thicknesses. Exposure time for all runs was 5 minutes.

For each sample, the surface contact angle was measured with a goniometer after the surface was exposed to a reactive blend. A set of "control" measurements of the surface contact angle was also made on six unexposed samples of each thickness. Each sample then was bonded to a piece of Heavy-Duty™ Reynolds aluminum foil, about 1-inch×2-inches, using Devcon 5-Minute™ epoxy. No pretreatment was performed on the aluminum foil. Additionally, for the 7.5-mil tests, an experimenter tested adhesion by attempting to manually pull the film from the foil. Any of a number of other liquid adhesives could have been used including polyurethanes, polysulfides, novolacs, cyanoacrylics and polyureas.

III. COMPARATIVE RESULTS

Table 1 shows the surface contact angles measured for the 5-mil ECTFE samples. Mean contact angles for the three sets of measurements were 83.9°, 75.2° and 44.0°, respectively. When the $F_2$ concentration was increased to 18%, a 5-minute exposure caused melting of the film.

TABLE 1

Contact Angle (degrees) - 5-mil ECTFE film

| Control | 5% $F_2$ | 10% $F_2$ |
|---|---|---|
| 81.8 | 76.5 | 43.7 |
| 84.1 | 74.0 | 44.3 |
| 87.5 | 72.8 | 40.0 |
| 86.0 | 73.9 | 43.2 |
| 85.8 | 77.0 | 47.5 |
| 78.1 | 76.8 | 45.5 |

Table 2 shows the surface contact angles measured for the 7.5-mil ECTFE samples. Mean contact angles for the three sets of measurements were 87.3°, 76.0° and 41.8°, respectively.

TABLE 2

Contact Angle (degrees) - 7.5-mil ECTFE film

| Control | 5% $F_2$ | 10% $F_2$ |
|---|---|---|
| 87.2 | 80.0 | 43.8 |
| 85.8 | 79.4 | 38.0 |
| 88.3 | 77.0 | 44.2 |
| 87.0 | 70.6 | 43.2 |
| 84.7 | 72.9 | 42.4 |
| 91.0 | 76.2 | 39.0 |

Table 3 shows the surface contact angles measured for the 10-mil ECTFE samples. Mean contact angles for the three sets of measurements were 79.3°, 75.2° and 42.1°, respectively.

TABLE 3

Contact Angle (degrees) - 10-mil ECTFE film

| Control | 5% $F_2$ | 10% $F_2$ |
|---|---|---|
| 74.5 | 74.4 | 47.3 |
| 85.1 | 77.1 | 46.1 |
| 90.0 | 76.9 | 48.0 |
| 71.6 | 74.7 | 39.4 |
| 77.4 | 76.1 | 35.8 |
| 76.9 | 72.1 | 36.2 |

In the six tests of adhesion where unexposed 7.5-mil ECTFE film was attached to the aluminum foil with the Devcon epoxy, the epoxy peeled off the film with almost no resistance. In the six tests where the film was exposed to a 5.00% concentration of $F_2$ and a 15.75% concentration of $O_2$, the epoxy separated from the film with little difficulty. In the six tests where the film was exposed to a 10.00% concentration of $F_2$ and a 10.50% concentration of $O_2$, the epoxy adhered so strongly to the film that failure always occurred by tearing of the aluminum foil.

These results demonstrate that enhanced bonding characteristics are achieved when the surface contact angle for a fluoro-oxidized ECTFE film surface is less than about 50 degrees. Preferably, the surface contact angle is less than 45 degrees.

It will be apparent to those skilled in the art of surface modification of polymeric substrates that ECTFE film surfaces can be fluoro-oxidized either using a batch process as was done for the experiments described herein, or in a continuous process where film is continuously rolled through a reactive gas chamber.

IV. SURFACE-MODIFIED SOLID OBJECTS

Surfaces of solid objects fabricated from ECTFE can be fluoro-oxidized to enable adhesion to plastic or metallic objects. An illustrative application is adhering a mixing shaft/impellor unit, molded in ECTFE, to a sprocket molded in nylon. The PATENT mixer is intended to agitate a highly corrosive liquid that does not attack ECTFE. The sprocket, which is not exposed to the liquid, can thus be molded in a material that is highly durable yet relatively inexpensive.

The simplest way to affix the ECTFE unit to the sprocket is to use a structural epoxy adhesive after surface-modifying the shaft. The unit is placed in a stainless steel chamber which is sealed and evacuated. A gaseous composition consisting of 12 percent $F_2$, 12 percent $O_2$, 45 percent $N_2$ and 31 percent $CO_2$ (all by volume) is admitted until a pressure of 1.0 atmosphere is reached. After a preselected exposure time the chamber is evacuated and air admitted. This purging reduces the concentration of fluorine in the chamber to a sufficiently low level so the chamber to be safely opened to remove the ECTFE unit. The nylon sprocket, which has a center hole sized to closely receive the ECTFE shaft, is bonded to the shaft using Devcon 5-Minute™ epoxy. The sprocket does not require pretreatment.

What is claimed is:

1. A process for modifying at least one surface of a fluoropolymer consisting essentially of a 1:1 alternating copolymer of ethylene and chlorotrifluoroethylene, comprising:

exposing said at least one surface of said fluoropolymer to a gaseous composition of a preselected pressure and comprising an effective concentration of molecular fluorine and an effective concentration of molecular oxygen for a preselected time sufficient to increase the surface energy of each said surface, thereby sufficiently decreasing the surface contact angle, with respect to a droplet of pure, deionized water, to allow bonding between the surface and a preselected adhesive.

2. The process of claim 1, wherein said preselected pressure is in a range from about 0.1 atmosphere to about 3.0 atmospheres, and said preselected temperature is in a range from about 45° F. to about 250° F.

3. The process of claim 2, wherein the concentration of molecular fluorine in the gaseous composition is from about 7 to about 25 percent by volume, and said preselected pressure is about 1.0 atmosphere.

4. The process of claim 2, wherein the concentration of molecular fluorine in the gaseous composition is from about 10 to about 15 percent by volume, and said preselected pressure is about 1.0 atmosphere.

5. The process of claim 2, wherein the concentration of molecular oxygen in the gaseous composition is from about 7 to about 25 percent by volume, and said preselected pressure is about 1.0 atmosphere.

6. The process of claim 2, wherein the concentration of molecular oxygen in the gaseous composition is from about 10 to about 15 percent by volume, and said preselected pressure is about 1.0 atmosphere.

7. The process of claim 2, wherein the gaseous composition comprises molecular fluorine in an amount from about 7 to about 25 percent by volume and molecular oxygen in an amount from about 7 to about 25 percent by volume, and said preselected pressure is about 1.0 atmosphere.

8. A fluoropolymer film of a preselected thickness having at least one fluoro-oxidized surface, the film consisting essentially of a 1:1 alternating copolymer of ethylene and chlorotrifluoroethylene, wherein at least one said fluoro-oxidized surface has a surface contact angle, with respect to a droplet of pure, deionized water, of less than about 50 degrees.

9. The film of claim 8, wherein at least one said fluoro-oxidized surface has a surface contact angle, with respect to a droplet of pure, deionized water, of less than about 45 degrees.

10. The film of claim 8, wherein surface fluoro-oxidation is developed through fluoro-oxidation using a batch process.

11. The film of claim 8, wherein surface fluoro-oxidation is developed through fluoro-oxidation using a continuous process.

12. A three-dimensional object fabricated from a fluoropolymer having at least one fluoro-oxidized surface, the fluoropolymer consisting essentially of a 1:1 alternating copolymer of ethylene and chlorotrifluoroethylene,-wherein at least one said surface has a surface contact angle, with respect to a droplet of pure, deionized water, of less than about 50 degrees.

* * * * *